United States Patent
Goodwin, III

(12)
(10) Patent No.: US 6,816,840 B1
(45) Date of Patent: Nov. 9, 2004

(54) SYSTEM AND METHOD OF SENDING MESSAGES TO A GROUP OF ELECTRONIC PRICE LABELS

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 689 days.

(21) Appl. No.: 09/167,897

(22) Filed: Oct. 7, 1998

(51) Int. Cl.⁷ .............................................. G06F 17/60
(52) U.S. Cl. ...................................................... 705/20
(58) Field of Search ............................. 705/16, 20, 21

(56) References Cited

U.S. PATENT DOCUMENTS

| | | | |
|---|---|---|---|
| 4,002,886 A | | 1/1977 | Sundelin ................ 235/61.7 R |
| 4,500,880 A | | 2/1985 | Gomersall et al. ..... 340/825.35 |
| 4,924,363 A | | 5/1990 | Kornelson .................. 362/125 |
| 5,172,314 A | | 12/1992 | Poland et al. ............... 364/401 |
| 5,448,226 A | | 9/1995 | Failing, Jr. et al. ..... 340/825.35 |
| 5,473,146 A | * | 12/1995 | Goodwin, III .............. 235/383 |
| 5,704,049 A | * | 12/1997 | Briechle ..................... 395/326 |
| 5,736,967 A | * | 4/1998 | Kayser et al. ................. 345/1 |
| 5,797,132 A | * | 8/1998 | Altwasser .................... 705/16 |
| 5,933,813 A | * | 8/1999 | Teicher et al. ................ 705/26 |
| 5,995,015 A | * | 11/1999 | DeTemple et al. ..... 340/825.49 |

FOREIGN PATENT DOCUMENTS

| | | |
|---|---|---|
| EP | 0764913 | 3/1997 |
| EP | 0833296 | 4/1998 |
| EP | 0834854 | 4/1998 |
| EP | 0992925 A2 * | 4/2000 |

OTHER PUBLICATIONS

ERS Press Release, "Electronic Retailing Systems International Provides Additional Product Capability based on Subglobal Addressing Patent Award", Jan. 27, 1998.*

* cited by examiner

Primary Examiner—Susanna Meinecke-Diaz
(74) Attorney, Agent, or Firm—Paul W. Martin

(57) ABSTRACT

An electronic price label (EPL) system which is capable of communicating with a group of EPLs. The system includes the group of EPLs, which is less than the total number of EPLs within a transaction establishment, and a computer which records a unique group identifier for a group of products associated with the EPLs, determines unique EPL identifiers for the group of EPLs from a table linking the unique group identifier to the unique EPL identifiers, and sends messages addressed to the unique EPL identifiers which contain identical information.

22 Claims, 3 Drawing Sheets

SYSTEM AND METHOD OF SENDING MESSAGES TO A GROUP OF ELECTRONIC PRICE LABELS

BACKGROUND OF THE INVENTION

The present invention relates to electronic price label (EPL) systems, and more specifically to a system and method of sending messages to a group of EPLs.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

The primary method of addressing an EPL is by its unique EPL identifier (unique addressing) or by a broadcast EPL identifier to which all EPLs respond (global addressing). Use of an item identification code, such as a price look-up (PLU) number is one type of unique addressing. Use of arbitrary numbers is another.

U.S. Pat. No. 5,704,049 to Briechle discloses an additional addressing method called "subglobal addressing", which allows messages to be sent to groups of EPLs in order to increase bandwidth and resolve collisions between EPL responses. However, this method adds cost to the EPLs because it requires additional registers with the EPLs for storing additional addresses. Also, each tag can only be in one group at a time. This patent is hereby incorporated by reference.

In order to obtain a competitive advantage, retailers must effectively market their products. A typical marketing strategy is to define groups of merchandise items to which the retailer can tailor its promotion and pricing policies.

Therefore, it would be desirable to provide a system and method of sending messages to a group of EPLs which automatically manages addressing of messages to EPLs as promotion and pricing policies for the group change. It would also be desirable to provide a system and method of sending messages to different groups of EPLs in which some EPLs may be in more than one group.

SUMMARY OF THE INVENTION

In accordance with the teachings of the present invention, a system and method of sending messages to a group of electronic price labels (EPLs) is provided.

The system includes the group of EPLs, which is less than the total number of EPLs within a transaction establishment, and a computer which records a unique group identifier for a group of products associated with the EPLs, determines unique EPL identifiers for the group of EPLs from a table linking the unique group identifier to the unique EPL identifiers, and sends messages addressed to the unique EPL identifiers which contain identical information.

A method of sending messages to a group of electronic price labels (EPLs) less than a total number of EPLs within a transaction establishment includes the steps of determining a unique group identifier for the group, determining unique EPL identifiers for the group of EPLs from a table linking the unique group identifier to the unique EPL identifiers, and sending messages addressed to the unique EPL identifiers which contain identical information.

It is accordingly an object of the present invention to provide a system and method of sending messages to a group of EPLs.

It is another object of the present invention to provide a system and method of sending messages to a group of EPLs associated with a predetermined group of merchandise items.

It is another object of the present invention to provide a system and method of sending messages to different groups of EPLs associated with predetermined different groups of merchandise items in which some EPLs may be in more than one group.

It is another object of the present invention to provide a system and method of addressing EPLs.

It is another object of the present invention to provide a system and method of sending messages to a group of EPLs which automatically manages addressing of messages to EPLs as promotion and pricing policies for the group change.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
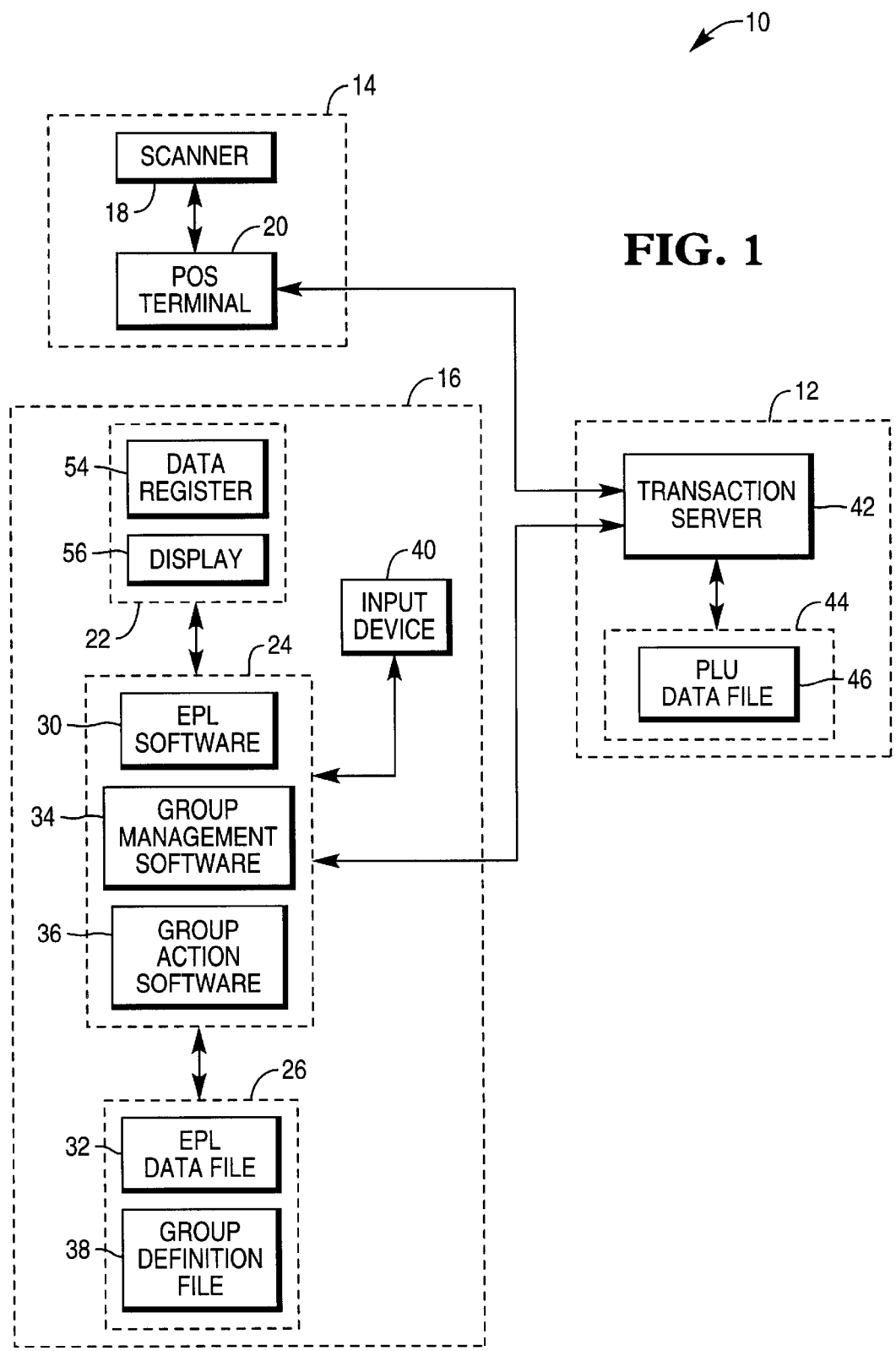
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL terminal 24, and EPL storage medium 26.

EPLs 22 include a data register 54 and a display 56. Data registers 54 contain data, usually price data, sent from EPL software 30. The data is typically displayed by displays 56.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in PLU data file 46 as they are entered in input device 40 (immediate processing) or after they have been stored within price look-up (PLU) data file 46.

EPL terminal 24 also executes EPL group management software 34 and EPL group action software 36. EPL group management software 34 creates and manages group assignments for EPLs 22 through their associated merchandise items. Through operator input, EPL group management software 34 can add, delete, and change information associated with groups of EPLs or individual EPLs. An operator may directly input information through input device 40. Alternatively, an operator may input information through a batch file, which executes a plurality of instructions, or through a message. These alternatives are useful if EPL group management software 34 is executed in multiple locations by different computers, such as another in-store computer or a host computer outside the store. This allows the retailer the flexibility to define and initiate group messaging from all store management levels.

Group assignments may be based upon any number of classifications. For example, group assignments may be based upon item categories or location or item department. One group might be all items "on sale" under special pricing or promotional terms on a predetermined day or all items "on sale" within a predetermined department or location. Thus, products and their EPLs may be in more than one group.

EPL group action software 36 formulates messages to EPL modules upon operator input and automatically addresses the messages by reading all records in EPL group identification file 34. The messages contain commands for changing information displayed by EPLs 22. Examples of information to be displayed by groups of EPLs 22 include phrases such as "ON SALE", "ON SALE/SAVE 0.40", "BOGO" (buy one, get one free), "OUT OF/STOCK", and "DEL 0217" (next scheduled delivery February 17th). Operator input may be through input device 40, through a file, or through a message.

EPL storage medium 26 stores EPL data file 32 and EPL group definition file 38. EPL storage medium 26 and is preferably a fixed disk drive.

EPL data file 32 contains EPL identification and price checksum information. Price checksum information is calculated from price information in PLU data file 46. EPL data file 32 contains current information displayed by EPLs 22.

EPL group definition file 38 contains a list of groups and their identification numbers, as well as a table linking EPL identifiers to group identification numbers.

Input device 40 is preferably a keyboard.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2:
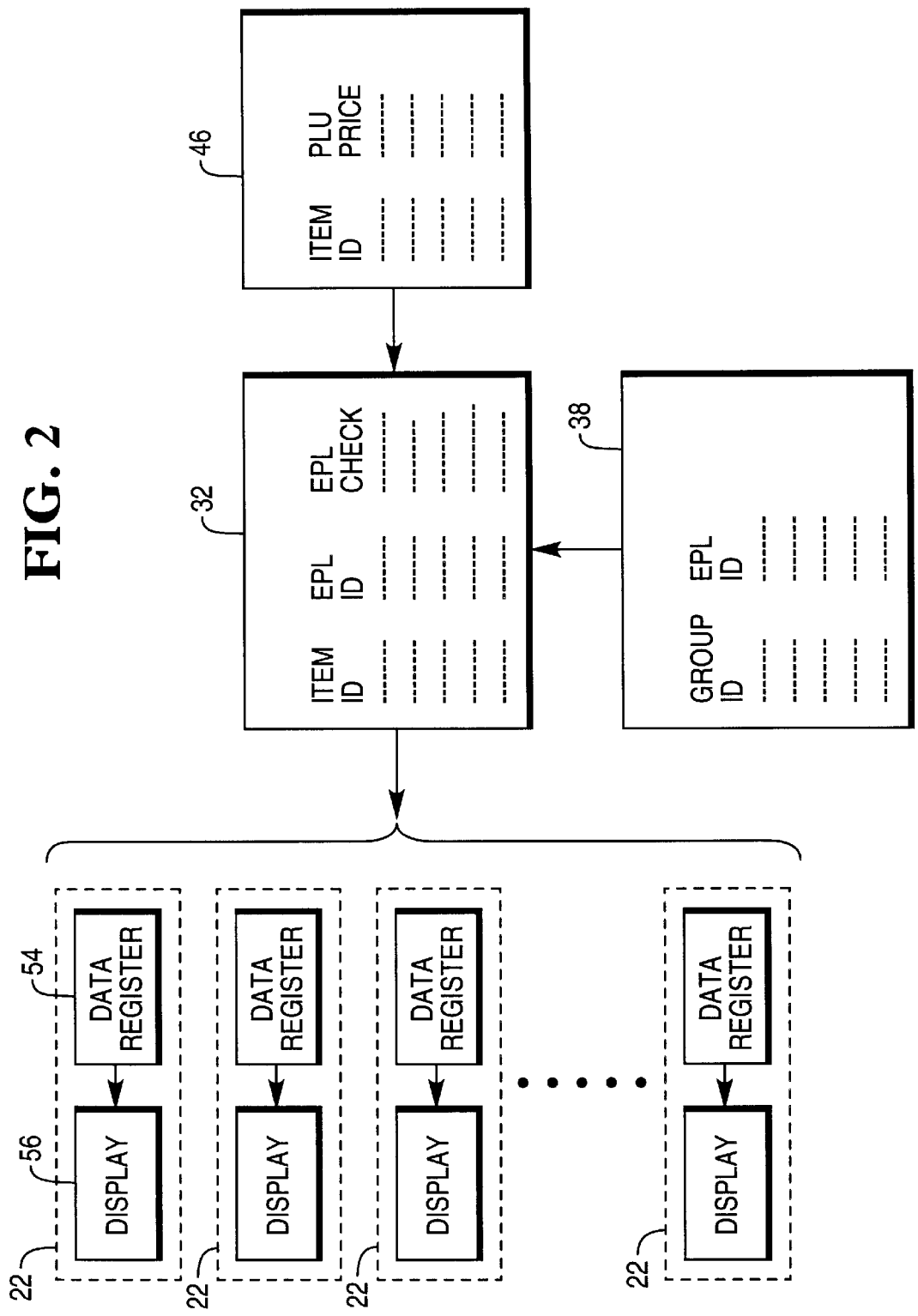
FIG. 2 is a diagram showing data files used within a transaction establishment.

Turning now to FIG. 2, EPL data file 32, EPL group definition file 38, and PLU data file 46 are shown in more detail.

EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 56.

EPL group definition file 38 includes a line entry for each EPL 22 which is assigned to a group. Each line entry has an EPL identification entry (EPL ID) and a group identifier (GROUP ID).

Entry EPL ID identifies an EPL. Entry GROUP ID is a group identifier, such as a group name or number, to which the corresponding EPL is assigned. EPLs may be in multiple groups.

PLU data file 46 includes a line entry for each item sold in the transaction establishment. Each line entry has at least an item identification entry (ITEM ID) and a PLU price entry (PLU PRICE).

Entry ITEM ID identifies a store item. Entry PLU PRICE identifies the price read by POS system 14 to determine the price of each item during scanning by bar code reader 18.

During normal operation, an operator sends messages to EPLs 22 within any of the assigned groups using EPL group action software 36. EPL group action software 36 records operator group choices and information to be displayed by the EPLs in each group. Following operator input, EPL group action software 36 reads EPL group definition file 38 to obtain the EPL identifiers for the EPLs 22 in each group and formulates the messages for transmission. EPL software 30 then schedules and sends the messages.

For example, an operator may define a group called the "cereal" group, which contains only EPLs 22 that are assigned to cereal products, using EPL group management software 34. In order to send a message to the only the EPLs 22 assigned to the cereal products, the operator uses EPL group action software 36.

Under the present invention, some of EPLs 22 in one group may be in another defined group. For example, some of the EPLs assigned to the cereal group may also be in a defined group called the "health foods" group.

Figure 3:
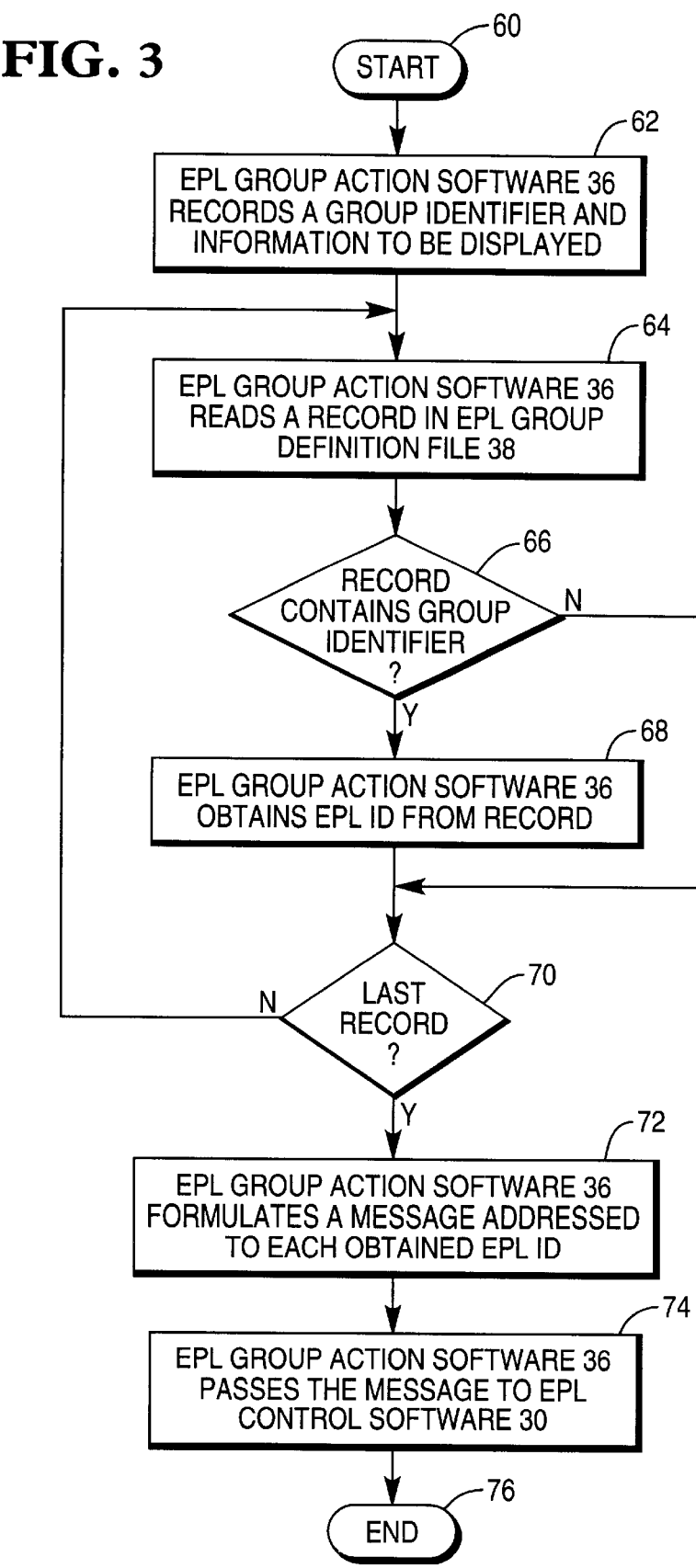
FIG. 3 is a flow diagram illustrating the method of the present invention.

Turning now to FIG. 3, the method of operation of EPL group action software 36 is illustrated in more detail beginning with START 60.

In step 62, EPL group action software 36 records a group identifier and information to be displayed by EPLs within the group. EPL group action software 36 may record the group identifier and information from keyboard, file, or message input. Thus, group identifiers and associated information may be recorded through manual or batch input.

In step 64, EPL group action software 36 reads a record in EPL group definition file 38.

In step 66, EPL group action software 36 determines whether the record contains the recorded group identifier. If so, operation proceeds to step 68. If not, operation jumps to step 70.

In step 68, EPL group action software 36 obtains an EPL identifier from the record.

In step 70, EPL group action software 36 determines whether the record is the last record in EPL group definition file 38. If so, operation proceeds to step 72. If not, operation returns to step 64 to read another record. In this way, EPL group action software 36 automatically checks all records in EPL group definition file 38 to obtain EPL identifiers for a group EPLs each time a message must be sent to the group of EPLs.

In step 72, EPL group action software 36 formulates a message addressed to each EPL identifier obtained from EPL group definition file 38.

In step 74, EPL group action software 36 passes the message to EPL control software 30 for scheduling and transmission.

In step 76, operation ends.

Advantageously, EPL group management software 34 and EPL action software 36 provide a way to group EPLs along product groups and an additional way to address EPLs. EPL action software 36 automatically manages addressing of EPLs as promotion and pricing policies for product groups change so that retailers can more effectively market their product groups.

An additional advantage is that an operator can effectively communicate messages to a group of EPLs including different types of EPLs. For example, an operator can effectively communicate to a group of EPLs regardless of the number of address registers contained within the EPLs: the method works with EPLs which support subglobal addressing and those that don't. This feature gives the system the utmost flexibility in design and upgrading.

Although the present invention has been described with particular reference to certain preferred embodiments thereof, variations and modifications of the present invention can be effected within the spirit and scope of the following claims. For example, EPL group management software 34 and EPL action software 36 may be a single application.

I claim:

1. A method of sending messages to a group of electronic price labels (EPLs) less than a total number of EPLs within a transaction establishment comprising the steps of:
   (a) determining a unique group identifier for the group;
   (b) determining unique EPL identifiers for each EPL in the group of EPLs from a table linking the unique group identifier to the unique EPL identifiers; and
   (c) sending messages addressed to the unique EPL identifiers which contain identical information.

2. A method of sending messages for promoting a group of products to a corresponding group of electronic price labels (EPLS) less than a total number of EPLs within a transaction establishment comprising the steps of:
   (a) determining a unique group identifier for the group of products;
   (b) determining unique EPL identifiers for each EPL in the group of EPLs from a table linking the unique group identifier to the unique EPL identifiers; and
   (c) sending messages addressed to the unique EPL identifiers which contain identical promotional information to be displayed by the group of EPLs for promoting the group of products.

3. A method of sending messages to a group of electronic price labels (EPLS) less than a total number of EPLs within a transaction establishment comprising the steps of:
   (a) including in the group first and second different types of EPLs;
   (b) determining a unique group identifier for the group;
   (c) determining unique EPL identifiers for each of the EPLs from a table linking the unique group identifier to the unique EPL identifiers; and
   (d) sending messages addressed to the unique EPL identifiers which contain identical promotional information.

4. A method of sending messages to a group of electronic price labels (EPLs) less than a total number of EPLs within a transaction establishment comprising the steps of:
   (a) including in the group at least one EPL of a first type capable of only unique and global addressing communication methods and at least one EPL of a second type capable of unique, global, and subglobal communication methods;
   (b) determining a unique group identifier for the group;
   (c) determining unique addresses for each of the EPLS from a table linking the unique group identifier to the unique EPL identifiers; and
   (d) sending messages addressed to the unique addresses of the EPLs which contain identical promotional information.

5. A method of sending messages containing identical promotional information to a group of electronic price labels (EPLs) less than a total number of EPLs within a transaction establishment comprising the steps of:
   (a) providing a unique group identifier for the group;
   (b) linking the group identifier to unique EPL addresses in a table;
   (c) determining that the messages containing the information must be sent to the group of EPLS;
   (d) determining a unique group identifier for the group;
   (e) determining unique addresses for each of the EPLs from a table linking the unique group identifier to the unique EPL identifiers; and
   (f) sending messages addressed to the unique addresses of the EPLs which contain the identical promotional information.

6. A method of sending messages for promoting a group of products to a corresponding group of electronic price labels (EPLS) less than a total number of EPLS within a transaction establishment comprising the steps of:
   (a) forming the group of products;
   (b) assigning a unique group identifier to the group of products;
   (c) linking the unique group identifier to unique EPL addresses in a table;
   (d) determining that the messages containing the information must be sent to the group of EPLS;
   (e) identifying the unique group identifier for the group by a computer;
   (f) identifying the unique EPL addresses for each of the EPLs in the group of EPLs from the table by the computer;
   (g) creating the messages by the computer, including the substep of
      (g-1) addressing the messages to the unique EPL addresses; and
   (h) sending the messages to each of EPLs in the group of EPLs by the computer.

7. The method as recited in claim 6, wherein step (a) comprises the substep of:
   (a-1) forming the group of products within a predetermined category of products.

8. The method as recited in claim 6, wherein step (a) comprises the substep of:
   (a-1) forming the group of products based upon location of the products.

9. The method as recited in claim 6, wherein step (a) comprises the substep of:
   (a-1) forming the group of products based upon promotion terms of the products.

10. The method as recited in claim 6, wherein step (g) further comprises the substep of:
    (g-2) recording the messages by an input device coupled to the computer.

11. The method as recited in claim 6, wherein step (g) further comprises the substep of:

(g-2) receiving the messages from another computer coupled to the one computer.

12. The method as recited in claim 6, wherein step (g) further comprises the substep of:

(g-2) receiving the messages from a batch file executed by the computer.

13. An electronic price label (EPL) system comprising:

a group of EPLs, less than a total number of EPLs within a transaction establishment, associated with a group of products; and a computer which records a unique group identifier for the group of products, determines unique EPL identifiers for each EPL within the group of EPLs from a table linking the unique group identifier to the unique EPL identifiers, and sends messages addressed to the unique EPL identifiers which contain identical information.

14. The system as recited in claim 13, wherein the computer is located in the transaction establishment.

15. The system as recited in claim 13, wherein the computer is located outside of the transaction establishment.

16. The system as recited in claim 13, further comprising:

another group of EPLs different than the one group of EPLs.

17. The system as recited in claim 16, wherein the other group of EPLs is associated with another group of products which includes a number of the products in the one group.

18. The system as recited in claim 16, wherein the other group of EPLs is associated with another group of products which has no products in common with the products in the one group.

19. The system as recited in claim 13, wherein the group of EPLs includes first and second different types of EPLs.

20. The system as recited in claim 19, wherein the first type of EPL is capable of only unique and global addressing communication methods and the second type of EPL is capable of unique, global, and subglobal communication methods.

21. A method of promoting a group of products less than a total number of products within a transaction establishment comprising the steps of:

(a) determining a unique group identifier for the group of products;

(b) determining unique EPL identifiers for a group of EPLs assigned to the products from a table linking the unique group identifier to the unique EPL identifiers;

(c) sending messages addressed to the unique EPL identifiers which contain identical promotional information to be displayed by the group of EPLs for promoting the group of products.

22. A method of promoting a group of products less than a total number of products within a transaction establishment comprising the steps of:

(a) determining a unique group identifier for the group of products;

(b) determining unique EPL identifiers for a group of EPLs assigned to the products from a table linking the unique group identifier to the unique EPL identifiers;

(c) sending messages addressed to the unique EPL identifiers which contain identical promotional information indicating to a customer that the products are on sale at special prices;

(d) receiving the messages by the EPLs; and (e) displaying the promotional information by the group of EPLs.

* * * * *